United States Patent
Jun et al.

(10) Patent No.: US 10,933,750 B2
(45) Date of Patent: Mar. 2, 2021

(54) VEHICLE AND METHOD FOR CONTROLLING THE SAME

(71) Applicants: HYUNDAI MOTOR COMPANY, Seoul (KR); KIA MOTORS CORPORATION, Seoul (KR)

(72) Inventors: JongChan Jun, Hwaseong-si (KR); Chang Yu Kim, Bucheon-si (KR); Jihye Kim, Ansan-si (KR); Kwan Sik Jeon, Suwon-si (KR); Hongjun Kim, Anyang-si (KR); Junsik Hwang, Suwon-si (KR); Kwon Hyoung Choi, Suwon-si (KR); Jinhyung Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 30 days.

(21) Appl. No.: 15/829,041

(22) Filed: Dec. 1, 2017

(65) Prior Publication Data

US 2018/0154793 A1  Jun. 7, 2018

(30) Foreign Application Priority Data

Dec. 7, 2016 (KR) .................. 10-2016-0165740

(51) Int. Cl.
*H01M 6/50* (2006.01)
*B60Q 1/48* (2006.01)
(Continued)

(52) U.S. Cl.
CPC ........ *B60L 3/0046* (2013.01); *B60H 1/00735* (2013.01); *B60H 1/00742* (2013.01);
(Continued)

(58) Field of Classification Search
None
See application file for complete search history.

(56) References Cited

U.S. PATENT DOCUMENTS

| 9,493,054 B2 * | 11/2016 | Lewis ................. B60H 1/2209 |
| 2013/0173102 A1 * | 7/2013 | Aldighieri ............... B60L 50/60 |
| | | 701/22 |

(Continued)

FOREIGN PATENT DOCUMENTS

| JP | 2015-131521 A | 7/2015 |
| KR | 10-2007-0110663 A | 11/2007 |

(Continued)

OTHER PUBLICATIONS

Machine translation of KR-20130042355-A, provided by https://worldwide.espacenet.com/ generated on Feb. 7, 2019 (Year: 2013).*

*Primary Examiner* — Adam D Tissot
*Assistant Examiner* — Laura E Linhardt
(74) *Attorney, Agent, or Firm* — Brinks Gilson & Lione

(57) ABSTRACT

A vehicle may include: a power-supplier; a starting part to receive an ignition command; a drive part to generate driving force, braking force, and steering force using power of the power-supplier; a user interface (UI) to receive power from the power-supplier, a command from a user, and output image information; and a controller to control the drive part and the user interface (UI) upon receiving an ignition command, stop operation of the drive part upon receiving a command of a rest mode, and to perform and control operation of the user interface (UI). The vehicle may further include: an air conditioner to adjust an indoor temperature; an input to receive an operation command of the air conditioner, a target indoor temperature and a rest mode. The controller controls the air conditioner on the basis of detected indoor and outdoor temperatures.

15 Claims, 11 Drawing Sheets

(51) Int. Cl.

| | | |
|---|---|---|
| *B60H 1/00* | (2006.01) | |
| *B60K 11/00* | (2006.01) | |
| *B60L 3/00* | (2019.01) | |
| *B60L 11/18* | (2006.01) | |
| *B60T 7/08* | (2006.01) | |
| *B60T 7/04* | (2006.01) | |
| *B60T 7/18* | (2006.01) | |
| *B60L 1/02* | (2006.01) | |
| *B60L 58/26* | (2019.01) | |
| *B60L 53/00* | (2019.01) | |
| *B60L 50/16* | (2019.01) | |
| *B60L 58/12* | (2019.01) | |
| *B60J 1/17* | (2006.01) | |
| *B60T 1/10* | (2006.01) | |
| *F16D 61/00* | (2006.01) | |

(52) U.S. Cl.
CPC ..... *B60H 1/00778* (2013.01); *B60H 1/00978* (2013.01); *B60L 1/02* (2013.01); *B60L 3/0023* (2013.01); *B60L 11/1862* (2013.01); *B60L 50/16* (2019.02); *B60L 53/00* (2019.02); *B60L 58/12* (2019.02); *B60L 58/26* (2019.02); *B60T 7/042* (2013.01); *B60T 7/085* (2013.01); *B60T 7/18* (2013.01); *B60J 1/17* (2013.01); *B60L 2240/36* (2013.01); *B60L 2240/545* (2013.01); *B60L 2250/20* (2013.01); *B60L 2260/26* (2013.01); *B60T 1/10* (2013.01); *F16D 61/00* (2013.01)

(56) References Cited

U.S. PATENT DOCUMENTS

2014/0174712 A1\*  6/2014  Yang .................. H01M 10/625
                                                                165/287
2015/0035435 A1\*  2/2015  Alberti ..................... B60Q 1/08
                                                                 315/82

FOREIGN PATENT DOCUMENTS

| KR | 20130042355 A | \* | 4/2013 |
| KR | 10-1283292 B | | 7/2013 |
| KR | 10-2015-0037251 A | | 4/2015 |
| KR | 10-2016-0047253 A | | 5/2016 |

\* cited by examiner

VEHICLE AND METHOD FOR CONTROLLING THE SAME

CROSS-REFERENCE TO RELATED APPLICATION

This application claims the priority to and the benefit of Korean Patent Application No. 10-2016-0165740, filed on Dec. 7, 2016, which is incorporated herein by reference in its entirety.

FIELD

The present disclosure relate to a vehicle to travel using power of a rechargeable power-supplier, and a method for controlling the same.

BACKGROUND

The statements in this section merely provide background information related to the present disclosure and may not constitute prior art.

A vehicle is an apparatus to move on the road by driving of vehicle wheels.

The vehicle may include an internal combustion engine (a general engine vehicle) to generate mechanical power by burning oil (petroleum) fuels such as gasoline or diesel as well as to travel on the road using the mechanical power, whereas eco-friendly vehicles travel on the road using electricity as power source so as to reduce fuel consumption and the amount of discharged harmful gas from the vehicles.

In this case, the eco-friendly vehicle may include an electric vehicle, a hybrid vehicle, and a fuel cell electric vehicle. The electric vehicle may drive vehicle wheels using a motor. The hybrid vehicle or the fuel cell electric vehicle may include an engine, a battery, and a motor, and may travel on the road using mechanical power of the engine and also electric power of the battery.

The hybrid vehicle may travel on the road in an electric vehicle (EV) mode in which power of the motor is used only, or may travel on the road in a hybrid electric vehicle (HEV) mode in which power of the engine and power of the motor are used. The hybrid vehicle may also perform a regenerative braking (RB) mode in which braking energy or inertial energy is recovered through electric generation of the motor during braking or coasting caused by inertia so as to charge the battery.

The hybrid vehicle may control a starter generator to operate as a generator by engine power, may control a starter generator to operate as a generator by power delivered through the engine in an energy regenerative mode such that the battery can be charged.

When a wire plug of a charger installed in a parking lot or a charging station is connected to a battery plug of the vehicle, the eco-friendly vehicle may receive power from the battery, and may charge the battery with the received power.

SUMMARY

The present disclosure provides a vehicle for controlling an air conditioner and a user interface (UI) when a rest mode starts, and stopping constituent elements related to a traveling mode, and a method for controlling the same.

It is another aspect of the present disclosure to provide a vehicle for performing an emergency mode when an emergency situation occurs in the rest mode, informing a user of information regarding the emergency situation, and a method for controlling the same.

In another aspect of the present disclosure, a vehicle may perform an emergency mode when an emergency situation occurs under the condition that passengers are present during an ignition OFF and standby mode, and a method for controlling the same.

Additional aspects of the present disclosure will be set forth in part in the description which follows and, in part, will be obvious from the description, or may be learned by practice of the present disclosure.

In one form of the present disclosure, a vehicle may include: a power-supplier; a starting part configured to receive an ignition command; a drive part configured to generate driving force, braking force, and steering force using power of the power-supplier; a user interface (UI) configured to receive power from the power-supplier, receive a command from a user, and output image information; and a controller configured to control the drive part and the user interface (UI) upon receiving the ignition command, stop operation of the drive part upon receiving a command of a rest mode, and perform/control operation of the user interface (UI).

The drive part includes a motor configured to generate rotational force upon receiving the power, and to transmit the generated rotational force to vehicle wheels.

The vehicle further includes: a detector configured to detect an amount of electric power generated from the power-supplier. The controller controls entry to the rest mode when the detected electric power amount is equal to or greater than a reference power amount, and to control output of information indicating impossible entry to the rest mode when the detected electric power amount is less than the reference power amount.

The vehicle further includes: a parking button configured to receive a lock and/or release command of an electronic parking brake (EPB) device. The controller controls entry to the rest mode when the parking button is turned on.

The power-supplier includes a rechargeable battery and a cooling part to cool the battery, and further includes a detector configured to detect a temperature of the battery; and the controller controls operation of the cooling part when the detected battery temperature is equal to or higher than a reference temperature during the rest mode.

The vehicle further includes: a detector configured to detect the amount of electric power generated from the power-supplier. The controller periodically detects the detected electric power amount during the rest mode, and controls ignition OFF when the detected electric power amount is less than a reference power amount.

The vehicle further includes a communicator configured to communicate with an external terminal. The controller controls the communicator to periodically transmit the detected electric power amount to the external terminal.

When the command of the rest mode is input, the controller is configured to sever power supplied to the drive part by controlling the power-supplier.

In another aspect of the present disclosure, a vehicle may include: a power-supplier; a starting part configured to receive an ignition command; a drive part configured to generate driving force, braking force, and steering force using power of the power-supplier; at least one temperature detector configured to detect an indoor temperature and an outdoor temperature; an air conditioner configured to receive power of the power-supplier, and adjust the indoor temperature; an input configured to receive an operation command of the air conditioner, a target indoor temperature, and a command of a rest mode; and a controller configured to control the drive part and the air conditioner upon receiving the ignition command, stop operation of the drive part upon receiving the command of the rest mode, and to control the air conditioner on the basis of the detected indoor temperature and the detected outdoor temperature.

The vehicle further includes: a charge amount detector configured to detect the amount of charges of a battery mounted to the power-supplier. The controller controls entry to the rest mode when the detected charge amount is equal to or greater than a reference power amount, to control output of information indicating impossible entry to the rest mode when the detected charge amount is less than the reference power amount, to periodically detect the detected charge amount during the rest mode, and to control ignition OFF when the detected charge amount is less than the reference power amount.

The vehicle further includes a detector configured to detect a temperature of the battery. The controller controls a cooling part mounted to the power-supplier when the detected battery temperature is equal to or higher than a reference temperature during the rest mode.

The vehicle further includes a communicator configured to communicate with an external terminal. The controller controls the communicator to periodically transmit the detected power amount to the external terminal.

The vehicle further includes: a passenger detector configured to detect the presence or absence of a passenger; and a communicator configured to communicate with an external terminal. The controller controls an emergency mode on the basis of the indoor temperature and the outdoor temperature when the presence of the passenger is decided during ignition-OFF control, and controls the communicator to transmit information of the emergency mode to the external terminal.

The vehicle further includes: an outdoor air fan configured to circulate outdoor air and indoor air; and an opening/closing part configured to open/close window glasses. The controller operates at least one of the outdoor air fan and the opening/closing part during control of the emergency mode.

The vehicle further includes: a user interface (UI) configured to receive a command of a user, and to output at least one of image information and sound information. The controller controls operation of the user interface (UI) upon receiving a command of the rest mode, acquires the amount of necessary power on the basis of destination information when the destination information is input to the user interface (UI), and controls execution stoppage of the rest mode on the basis of the amount of necessary power.

The vehicle further includes a lighting part. The controller controls lighting of the lighting part when a lighting function is selected during the rest mode.

The vehicle further includes a plug configured to connect the power-supplier to an external device. When a power source function is selected during the rest mode, the controller controls the power-supplier to supply power to the external device.

In another form of the present disclosure, a method for controlling a vehicle configured to perform traveling using a battery and a motor includes: upon receiving an ignition command, providing, by a controller, power to a drive part needed for vehicle traveling, an air conditioner needed to adjust a temperature of air, and a user interface (UI) needed to input/output information; and upon receiving a command of the rest mode, severing, by the controller, power supplied to the drive part, continuously providing power to at least one of the air conditioner and the user interface (UI), and performing the rest mode.

The performing the rest mode includes: detecting, by at least one temperature detector, an indoor temperature and an outdoor temperature; and controlling, by the controller, the air conditioner on the basis of the detected indoor temperature and the detected outdoor temperature.

The performing the rest mode includes outputting at least one of image information and sound information through the user interface (UI).

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
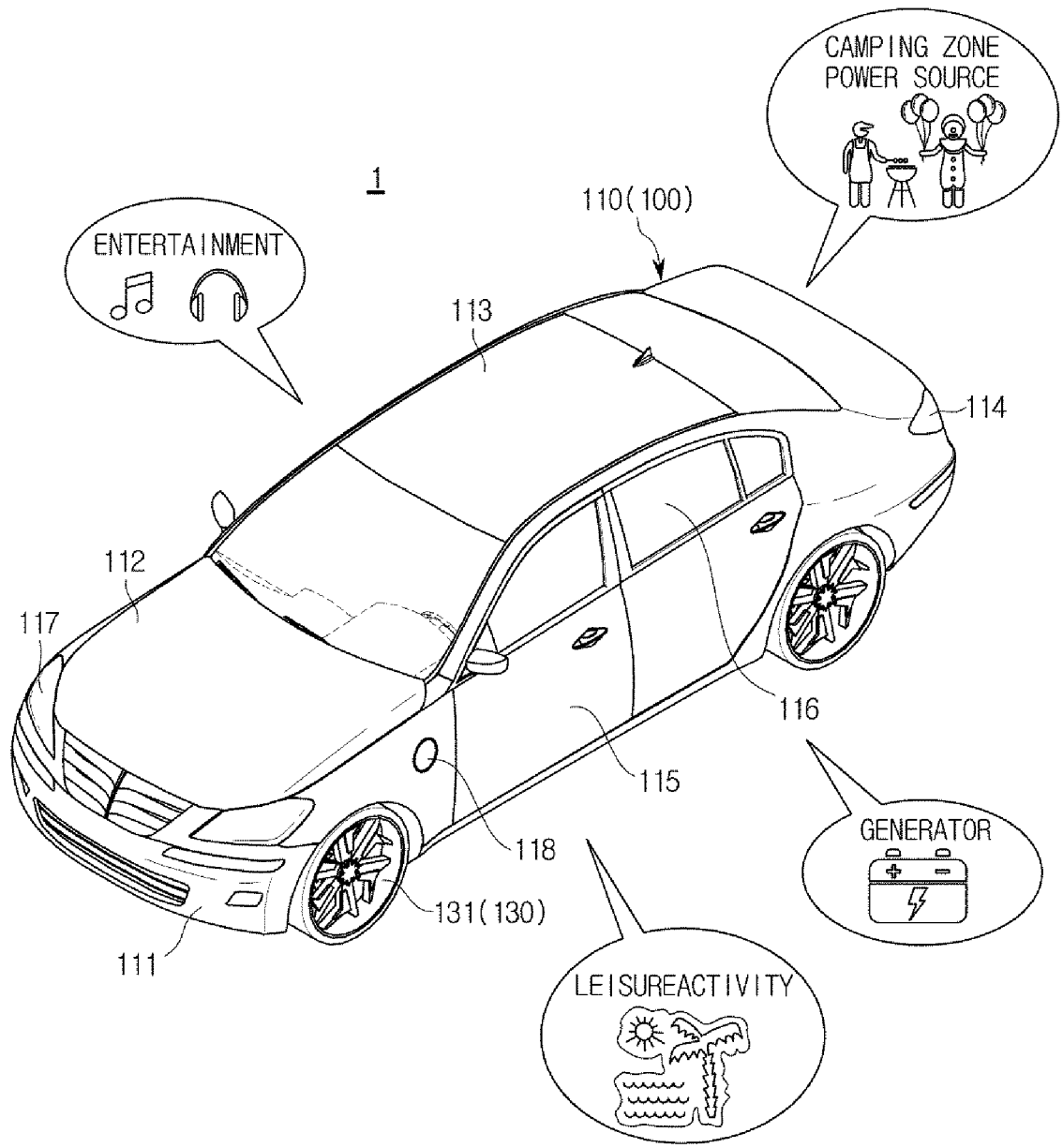
FIG. 1 is a perspective view illustrating the external appearance of a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
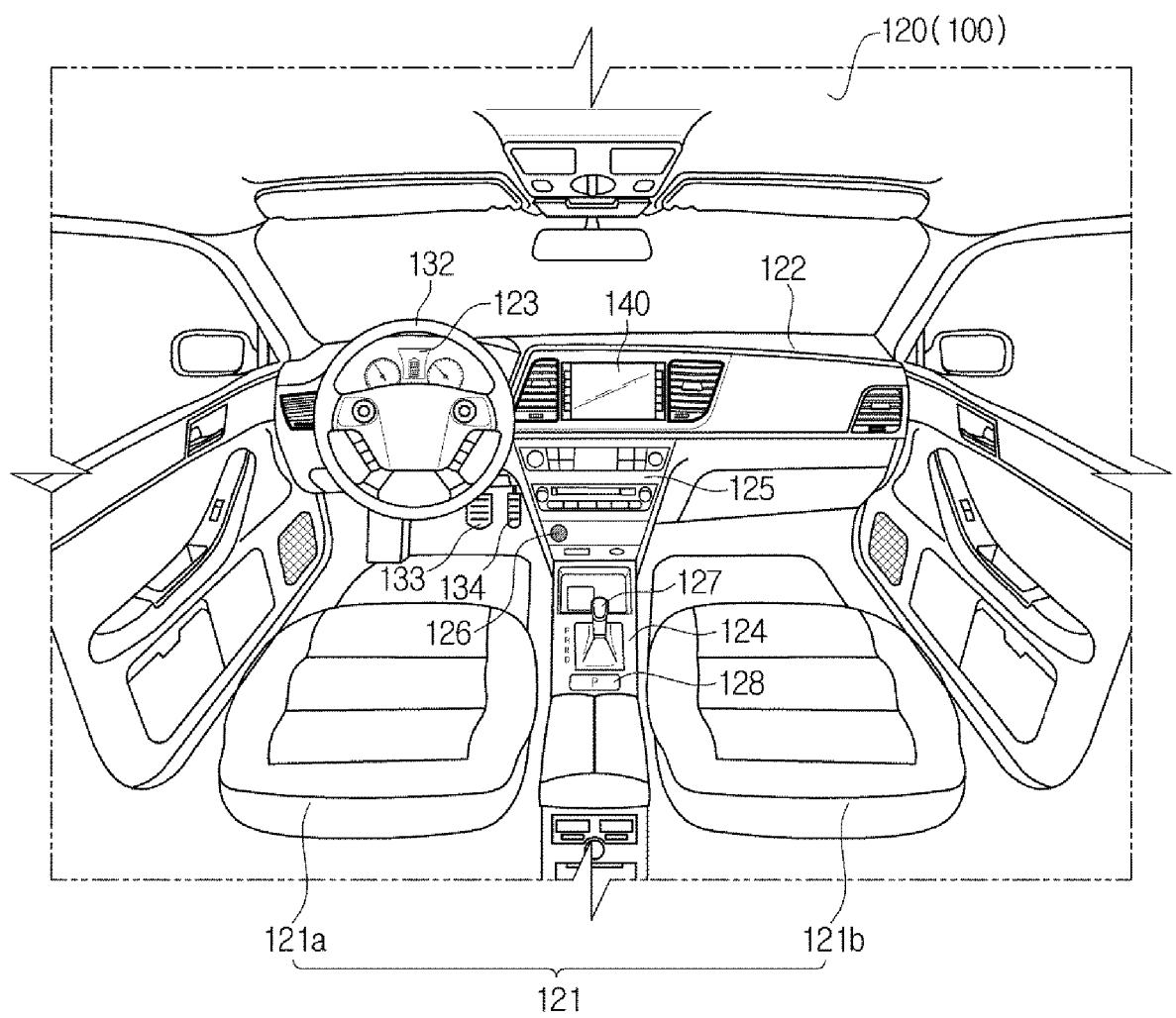
FIG. 2 is a view illustrating the internal structure of the vehicle in one form of the present disclosure.
Figure 3:
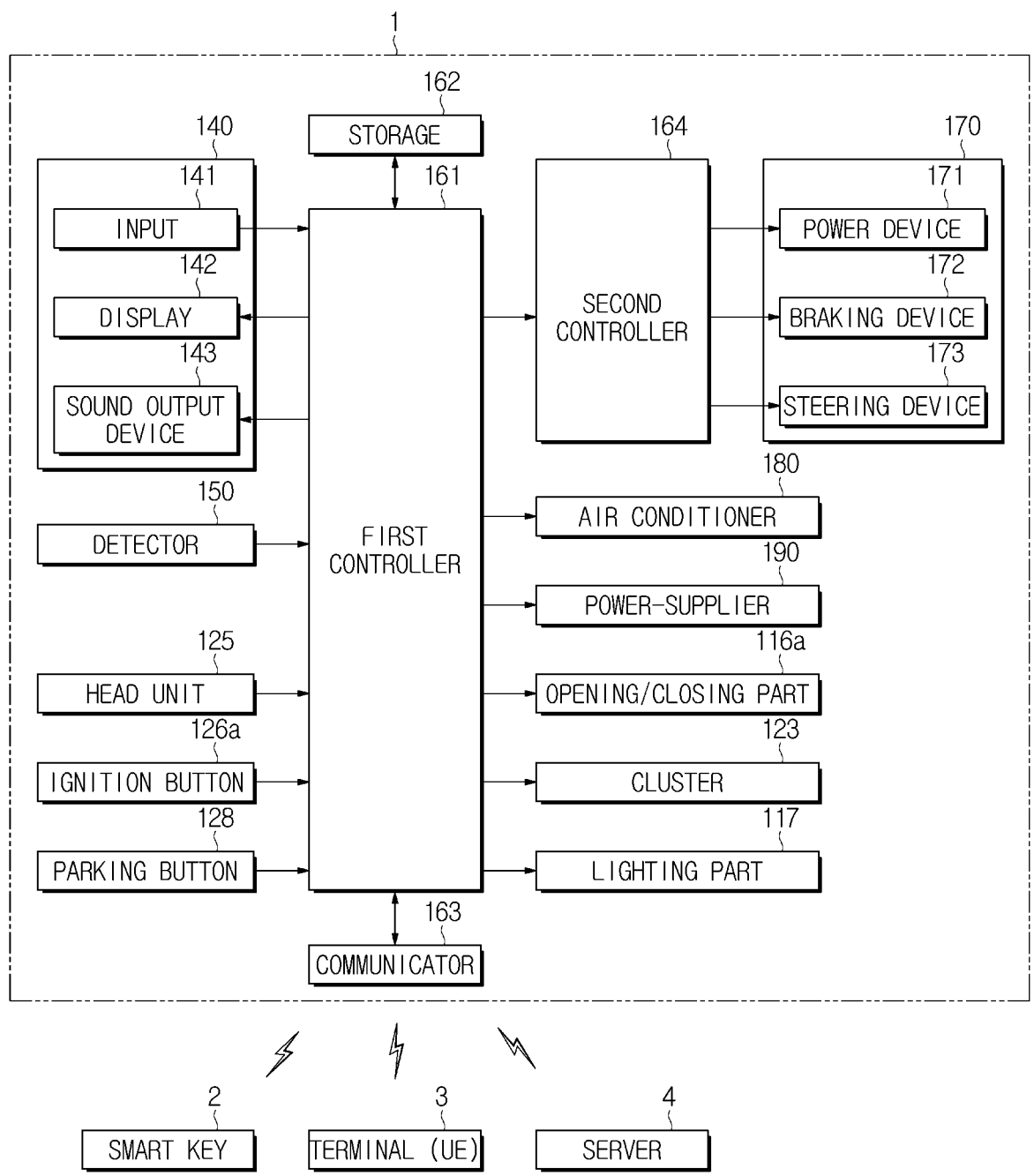
FIG. 3 is a block diagram illustrating the vehicle in one form of the present disclosure.

FIG. 1 is a perspective view illustrating the external appearance of a vehicle in one form of the present disclosure. FIG. 2 is a view illustrating the internal structure of the vehicle in one form of the present disclosure. FIG. 3 is a block diagram illustrating the vehicle in one form of the present disclosure.

The vehicle according to the form is an eco-friendly vehicle configured to travel on the road using a battery and a motor, and may include an electric vehicle and a hybrid vehicle.

A vehicle 1 may include a body 100 having interior and exterior parts, and a chassis which is a remaining portion other than the body 100 and is equipped with mechanisms required for driving thereof.

Referring to FIG. 1, an exterior part 110 of the body 100 may include a front panel 111, a bonnet (also called a hood) 112, a roof panel 113, a rear panel 114, and front-rear and left-right doors 115, and window glasses 116 installed at the front-rear and left-right doors 115.

The exterior part 110 of the body 100 may further include pillars provided at boundaries among the window glasses of the front-rear and left-right doors 115, side-view mirrors to provide a rear view of the vehicle 1 to a vehicle driver, and a lighting part 117. The lighting part 117 can perform a lighting function which allows a vehicle driver to look forward as well as to view all information of the vehicle, and can also perform a signaling and communication function for other vehicles and pedestrians.

The exterior part 110 of the body 100 may further include a charge cap 118 to open or close a charge hole in which a plug for charging the battery is installed.

Referring to FIG. 2, the interior part 120 of the body 100 includes seats 121 on which a passenger is seated; a dashboard 122; an instrument panel 123 (i.e., a cluster) (including a tachometer, a speedometer, a coolant thermometer, a fuel gauge, a turn signal indicator, a high beam indicator light, a warning light, a seat belt warning light, a mileage indicator, an odometer, an automatic transmission shift indicator, a door open warning light, an engine oil warning light, and a fuel shortage warning light, which are arranged on the dashboard 122 to output information related to driving); a center fascia 124 including an air vent of the air conditioner, a control panel, and an audio device; a heat part 125 to receive operation commands from the audio device and the air conditioner; and a starting part 126 located in the center fascia 124 to receive an ignition command.

The seats 121 may be seats on which a vehicle driver and passengers can be safely and pleasantly seated. The seats 121 may include a driver's seat 121a for the vehicle driver, a passenger seat 121b for a fellow passenger, and a rear seat arranged in the rear of the vehicle 1.

The seats 121 may include heating elements therein. The heating elements of the seats 121 may be provided to the driver's seat 121a, and may be selectively provided to the passenger seat 121b and the rear seat.

The seats 121 may include a ventilator installed therein, and may circulate air in the internal and external parts of the seats using one or more fans.

The ventilator of the seats 121 may be provided to the driver's seat 121, and may be selectively provided to the passenger seat 121b and the rear seat.

The ventilator of the seats 121 may further include one or more thermoelements, and may circulate warm air or cold air in the internal and external parts of the seats using the thermoelements and fans.

The starting part 126 of the vehicle may include an ignition button to be pressed by a user's finger or to receive a user touch signal, or may include a key box into which a key is inserted.

The vehicle may include a shift lever 127 provided to the center fascia 124 so as to receive a shift position, and a parking button (EPB button) 128 located in a peripheral region of the shift lever 127 or in the heat part 125 so as to receive an operation command of an electronic parking brake (EPB) device (not shown).

The manipulation position of the shift lever 127 may include a P-gear position, an R-gear position, an N-gear position, and a D-gear position. In the P-gear mode, a transmission or gearbox is locked to prevent movement of the vehicle when parking or engine ignition is performed. In the R-gear mode, the vehicle is driven in reverse. In the N-gear mode, a gear of the gearbox or transmission is not coupled, and the vehicle enters a neutral mode needed for traffic congestion or traffic signal waiting. In the D-gear mode, the D-gear may operate during vehicle traveling, and may be shifted from a $1^{st}$ gear to a maximum gear according to a transmission (or shifting) pattern.

If the driver depresses the accelerator to move the vehicle on the condition that the electronic parking brake (EPB) device is automatically locked in the P-gear mode, the EPB device may control the brake to be automatically released from the lock.

The chassis 130 of the vehicle serves to support the body of the vehicle, and may include vehicle wheels 131 respectively arranged at the front, rear, left and right sides; a power device to apply driving power to the front, rear, left and right wheels 131; a steering device; a brake device to apply braking force to the wheels 131; and a suspension device.

The power device may include a power generation device and a power transmission device.

The power generation device of the electric vehicle may include a motor.

The power generation device of the hybrid vehicle may include a motor, an engine, a fuel device, a cooling device, and an oil supply device.

The battery may be a main battery for generating a high-voltage current and supplying driving power to the vehicle.

The motor may convert electric energy of the battery into mechanical energy to operate various constituent elements embedded in the vehicle.

When the ignition button of the hybrid vehicle is turned on, the hybrid vehicle may operate the motor, and may drive the engine using the motor.

When the ignition button of the electric vehicle is switched on, a maximum current is supplied to the motor, such that a maximum torque occurs.

The vehicle 1 may further include an auxiliary battery (not shown). The auxiliary battery may generate a low-voltage current, and may be electrically connected to an audio device, an indoor light, a starter motor, and other electronic devices, such that the auxiliary batter may provide the low-voltage current as the driving power.

The auxiliary battery may be charged by the main battery.

The power transmission device may include at least one of a clutch, a transmission, a final reduction gear, a differential gear, and an axle.

The vehicle may include a steering wheel 132 of the steering device to steer the vehicle 1, a brake pedal 133 depressed by the driver's foot according to the driver's brake intention, and an accelerator pedal 134 depressed by the driver, as shown in FIGS. 1 and 2.

The vehicle may further include a user interface (UI) 140 for user convenience.

The user interface (UI) 140 may be embedded in the dashboard or may be installed as a stationary device on the dashboard.

The user interface (UI) 140 may include a display panel, and may include a touchscreen formed by integration of the display panel and a touch panel.

If only the display panel is provided as the user interface (UI) 140, the driver or user may select any one of buttons displayed on the UI 140 using an INPUT (not shown) independently mounted to the center fascia.

FIG. 3 is a block diagram illustrating the vehicle in one form of the present disclosure. The vehicle will hereinafter be described with reference to FIGS. 4 and 5.

Figure 4:
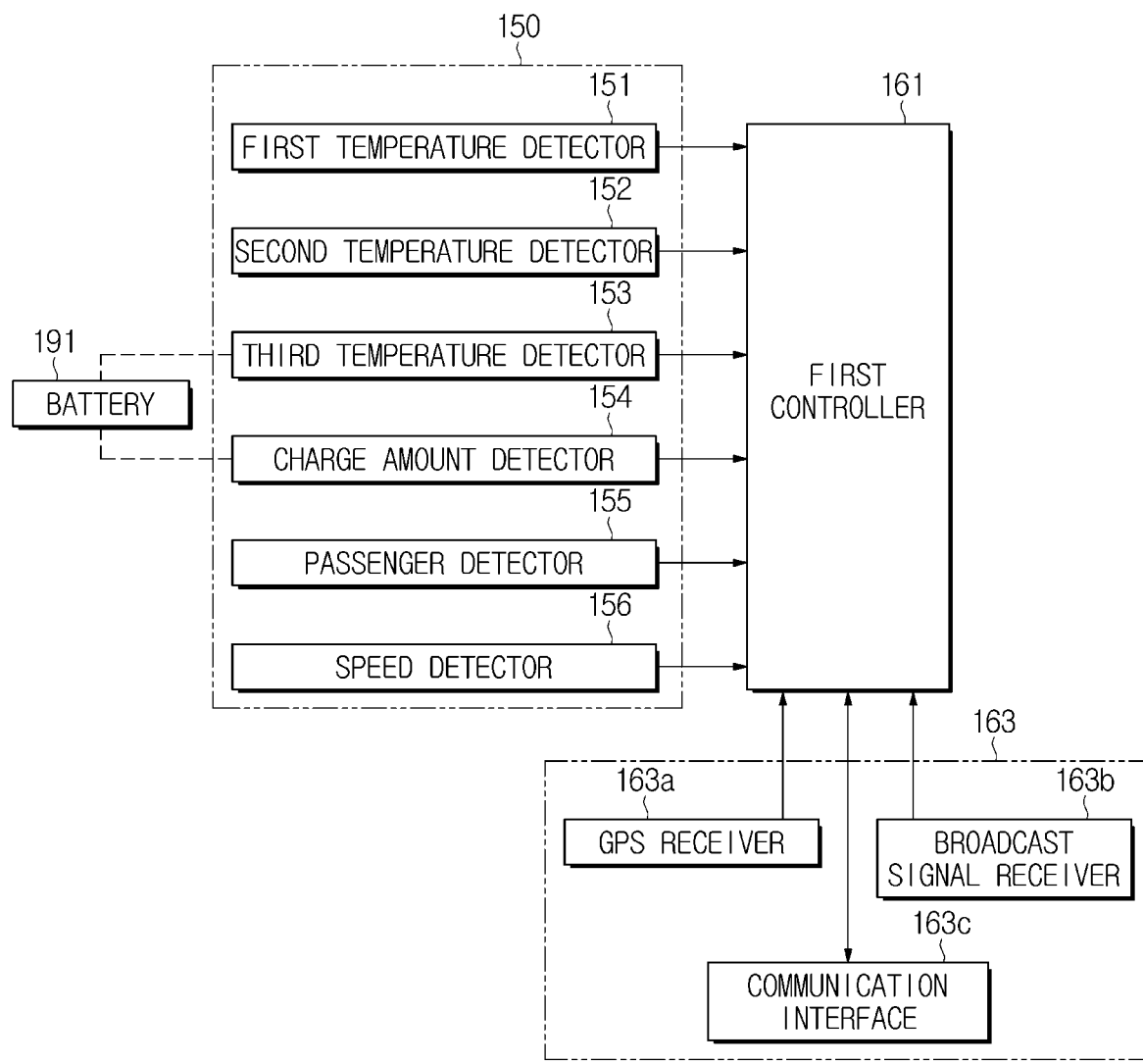
FIG. 4 is a block diagram illustrating a detector and a communicator of the vehicle in one form of the present disclosure.
Figure 5:
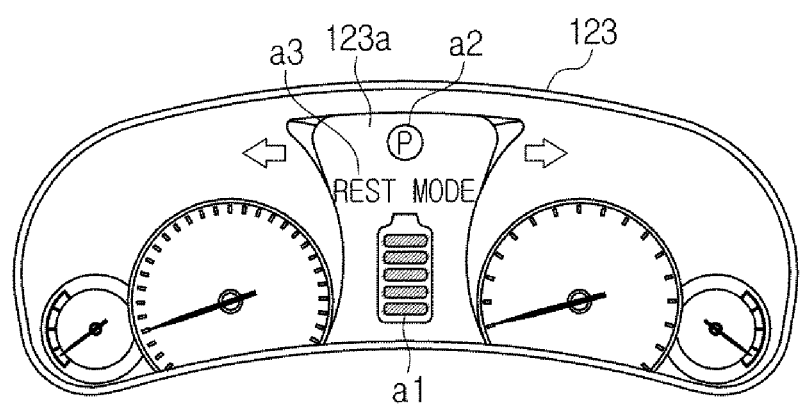
FIG. 5 is an exemplary view illustrating a cluster display of the vehicle in one form of the present disclosure.

FIG. 4 is a block diagram illustrating a detector and a communicator of the vehicle in one form of the present disclosure. FIG. 5 is an exemplary view illustrating a cluster display of the vehicle in one form of the present disclosure.

Referring to FIG. 3, the vehicle may include a user interface (UI) 140, a detector 150, a first controller 161, a storage 162, a communicator 163, a second controller 164, a drive part 170, an air conditioner 180, and a power-supplier 190.

The vehicle may communicate with at least one of a smart key 2, a terminal (e.g., UE: User Equipment) 3, and a server 4.

When the ignition button 126a is switched on, the user interface 140 may operate upon receiving power from the power-supplier 190.

The user interface 140 may receive an operation command of the rest mode, may receive a release command of the rest mode, or may receive an operation command of a drive mode (D-mode).

If the user or driver inputs the operation command of the rest mode, the user interface (UI) may display at least one executable function during the rest mode, and may perform a user-selected function.

The UI 140 may display a rest mode button for allowing the user or driver to input a command for operating the rest mode, and may also display a function button corresponding to at least one function.

The UI 140 may perform at least one of various functions, for example, an audio function, a video function, a navigation function, a DMB function, a radio function, and an Internet function.

During the rest mode, the UI 140 may receive at least one function, and may further receive an exterior lighting function, and an exterior power provision function.

The UI 140 may receive information regarding a destination after completion of the rest mode, may receive information regarding a password needed to enter or release the rest mode, and may receive information regarding a network of emergency contacts when an emergency situation occurs.

The UI 140 may also receive information regarding at least one of information regarding a target battery charge amount to be left in the rest mode and information regarding a movement distance after completion of the rest mode.

The UI 140 may receive a heating function of the seats and a ventilation function of the seats, may receive a cooling/heating mode, and may receive a target indoor temperature.

The UI 140 may include an input 141 to receive desired information from the user, and a display 142 to display user-input information and information regarding a currently executed function.

Here, the input 141 may be a touch panel or a button, and the display 142 may be a display panel.

The UI 140 may include a touchscreen formed by integration of the touch panel and the display panel.

The UI 140 may further include a sound output device 143 for outputting sound related to images displayed on the display 142 or sound corresponding to the audio function.

Here, the sound output device may be a speaker mounted to the vehicle.

The detector 150 may detect information needed for vehicle traveling and information regarding the user-pleasant environment.

In this case, information needed for vehicle traveling may include a vehicle speed and information regarding the amount of charges stored in the battery.

The information needed for the user-pleasant environment may include an indoor temperature and an outdoor temperature.

The detector 150 may detect information for recognizing an emergency situation during the rest mode.

Here, information for recognizing the emergency situation may include the indoor temperature, the outdoor temperature, the battery temperature, the battery charge amount information, and information regarding the presence or absence of one or more passengers.

Referring to FIG. 4, the detector 150 may include a first temperature detector 151 for detecting the indoor temperature of the vehicle, a second temperature detector 152 for detecting the outdoor temperature of the vehicle, a third temperature detector 153 for detecting the battery temperature, a charge amount detector 154 for detecting the amount of battery charges corresponding to the amount of power of the power-supplier, a passenger detector 155 for detecting the presence of one or more passengers, and a speed detector 156 for detecting a vehicle speed.

The charge amount detector 154 may include at least one of a current detector for detecting a battery current and a voltage detector for detecting a battery voltage.

Here, the voltage detector may detect a voltage generated from an output terminal of the battery.

The passenger detector 155 may include a pressure detector, a movement detector, an infrared (IR) light detector installed in the vehicle, or an ultrasonic detector, that is provided to the seats.

The speed detector 156 may include a wheel speed detector to detect the speed of front-rear wheels and left-right wheels or an acceleration detector to detect acceleration of the vehicle.

The vehicle acting as an input device for receiving information during the traveling mode and the rest mode may further include a head unit 125, an ignition button 126a, and a parking button 128.

The head unit 125 may include an input having a plurality of buttons, may receive a cooling mode, a heating mode, and an outdoor-air mode of the air conditioner, may receive a target indoor temperature, and may also receive a channel regarding the radio function.

In addition, the input mounted to the head unit 125 may receive a command for operating the rest mode and a command for releasing the rest mode.

The ignition button 126a may receive an ignition command of the vehicle.

The parking button 128 may receive a brake lock/release command of the brake device of the vehicle.

Upon receiving the ignition command by the ON operation of the ignition button 126a, the first controller 161 may provide power to the UI 140 such that the UI 140 can operate.

When the operation command of the rest mode is input through the UI 140 or the input of the head unit, the first controller 161 may transmit a command for stopping operation of the driver to the second controller 164, and may retain the operation of the UI 140.

The first controller 161 may control entry to the rest mode on the basis of a password received before entering the rest mode.

If the rest mode release command is input, the first controller 161 may also control release of the rest mode on the basis of the input password.

The first controller 161 may transmit the operation command to the second controller 164 when the rest mode is released.

The first controller 161 may confirm the amount of power of the power-SUPPLIER before entering the rest mode.

That is, the second controller 164 may control entry to the rest mode on the basis of the amount of battery charges detected by the charge amount detector 154, prior to entering the rest mode.

Here, the amount of battery charges may be acquired on the basis of at least one of a battery voltage and a battery current.

In addition, the form will hereinafter be described using the controller for acquiring the amount of battery charges as an example.

For example, the first controller 161 may confirm the detected battery voltage, and may acquire the amount of battery charges on the basis of the confirmed voltage of the battery 140.

In another example, the first controller 161 may confirm the detected battery input current and the detected battery output current, may integrate the confirmed battery input current and the confirmed battery output current on the basis of a current time, and may acquire the amount of battery charges therefrom.

In another example, the first controller 161 may acquire the amount of battery charges on the basis of the detected battery current and the detected battery voltage.

The first controller 161 may also correct the amount of acquired battery charges on the basis of the detected battery temperature.

If the operation command of the rest mode is input, the first controller 161 may also control entry to the rest mode on the basis of an EPB (Electronic Parking Brake) state, a communication state with the smart key, and a vehicle speed.

If the operation command of the rest mode is input, the first controller 161 may also automatically lock the Electronic Parking Brake (EPB) device.

The first controller 161 may control display of the confirmed battery charge amount, may control display of the rest mode, and may control displaying of the EPB lock state.

After the beginning of the rest mode, the first controller 161 may control displaying of at least one functional button capable of being selected by the user.

The first controller 161 may confirm the selected function button, and may control execution of the function corresponding to the confirmed function button.

In this case, the functions executable during the rest mode may include at least one of a video function, an audio function, a radio function, and an Internet function capable of being executed through the user interface (UI). The function may include a temperature control function executable by the air conditioner, an external lighting function executable by the lighting part, and an external power supply function executable by the power-supplier.

The temperature control function may include the heating mode, the cooling mode, and the outdoor air mode.

The first controller 161 may receive a target indoor temperature through at least one of the user interface (UI) and the head unit.

If the target indoor temperature is input, the first controller 161 may control the air conditioner on the basis of the indoor temperature and the outdoor temperature respectively detected by the first temperature detector and the second temperature detector.

The first controller 161 may control communication with the external server or the terminal (e.g., UE) acting as the terminal, and may control output of image information transmitted from the server or the terminal.

The first controller 161 may communicate with the external server, and may perform the Internet function through the UI.

The first controller 161 may control output of the emergency information on the basis of information regarding the network of stored emergency contacts when the emergency situation occurs.

The first controller 161 may perform the emergency mode when the emergency situation occurs, and may output the emergency mode information to at least one of the UI and the cluster.

The first controller 161 may recognize a season on the basis of the outdoor temperature, month (or date), and a difference between the outdoor temperature and the indoor temperature, and may determine any one of the heating mode and the cooling mode on the basis of the recognized season.

If information regarding a desired destination is input, the first controller 161 may acquire the distance to the destination on the basis of the current position information and the destination information, may acquire the amount of desired battery charges on the basis of the acquired distance information, and may control execution stoppage of the rest mode on the basis of the acquired battery charge amount and the detected battery charge amount.

The first controller 161 may also transmit information regarding stoppage of the rest mode and information regarding the detected battery charge amount to the terminal (e.g., UE) 3 on the basis of the network of emergency contacts, and may display the above-mentioned information on the cluster.

When the amount of target battery charges is input, the first controller 161 may also acquire the stoppage time of the rest mode on the basis of the input target charge amount and the detected battery charge amount.

If the mileage of the vehicle is input, the first controller 161 may acquire the desired battery charge amount corresponding to the input mileage, and may also acquire the stoppage time of the rest mode on the basis of the acquired battery charge amount and the detected battery charge amount.

When the stoppage time of the rest mode is decided, the first controller 161 may stop the rest mode and may perform ignition OFF.

If the stoppage time of the rest mode is decided, the first controller 161 may stop the rest mode, and may enter the standby mode as desired.

The first controller 161 may determine whether an emergency situation occurs on the basis of detection information of the detector during the rest mode. If the emergency situation occurs, the first controller 161 may enter the emergency mode.

In this case, the emergency situation may include: a situation of an abnormal operation of the air conditioner, a situation in which the detected indoor temperature is less than a first allowable indoor temperature, a situation in which the detected indoor temperature is higher than a second allowable indoor temperature, a situation in which the detected outdoor temperature is less than a first allowable outdoor temperature, a situation in which the detected outdoor temperature is higher than a second allowable outdoor temperature, and a situation in which the detected battery temperature is equal to or higher than a first reference battery temperature.

If the emergency situation caused by the indoor temperature occurs, the first controller 161 may control the air conditioner, may control the opening or closing operation of the window glasses, and/or may operate the outdoor air fan.

If the emergency situation caused by the malfunction of the air conditioner occurs, the first controller 161 may control the opening or closing of the window glasses, and may also control the outdoor air fan.

If the emergency situation caused by the battery temperature occurs, the first controller 161 may control the cooling part.

In the emergency mode, when the first controller 161 receives the command for releasing the emergency mode from the terminal 3, or when the release command of the emergency mode is input to the UI 140, the first controller 161 may release the emergency mode.

When the emergency mode is performed prior to execution of ignition OFF, the first controller 161 may determine whether the emergency mode is stopped on the basis of detection information of the detector. If it is determined that the emergency mode can be stopped without difficulty, the first controller 161 may stop the emergency mode, and may re-perform the rest mode.

If the execution stoppage time of the rest mode is decided, the first controller 161 may stop the rest mode or may enter the standby mode. In addition, the first controller 161 may confirm the presence or absence of at least one passenger in the vehicle. When the presence of the passenger is decided, the first controller 161 may periodically determine the occurrence or non-occurrence of the emergency situation on the basis of detection information of the detector. If occurrence of the emergency situation is decided, the first controller 161 may also control the vehicle to enter the emergency mode as desired.

When the emergency mode is performed in the standby mode, the first controller 161 may acquire position information of one or more charging stations located in the vicinity of a current vehicle on the basis of map information, may acquire the distance to the charging station position on the basis of the acquired charging station position information and the current position information, may acquire the amount of battery charges corresponding to the acquired distance, and may also perform the emergency mode on the basis of the acquired battery charge amount.

If the first controller 161 can communicate with the smart key, the brake pedal is depressed. If the shift lever is repeatedly changed a predetermined number of times from the P-gear (i.e., P-mode) to the D-gear (i.e., D-mode), the first controller 161 may also release the rest mode as desired.

The first controller 161 may lock the door during the rest mode, such that the door locked state is achieved.

The storage 162 may store an identification (ID) number of the smart key 2, an ID number of the terminal 3, the reference battery charge amount, and a first reference battery temperature and a second reference battery temperature needed to control battery cooling.

Here, the first reference battery temperature may be a temperature needed to control battery cooling, and the second reference battery temperature may be a temperature needed to stop battery cooling.

The reference battery charge amount may be denoted by SOC (State of Charge) of about 10%.

Here, SOC may be calculated on the basis of a first open voltage acquired when the battery is fully charged, a second open voltage acquired when the battery is fully discharged, and a temperature of the battery.

The storage 162 may store a target indoor temperature established by the user, and may store the target battery charge amount. During the emergency mode, the storage 162 may also store information regarding the opening degree of the windshield as desired.

The storage 162 may also store information regarding the network of emergency contacts.

The communicator 163 may communicate with at least one of the smart key 2, the terminal 3, and the server 4.

Referring to FIG. 4, the communicator 163 may include a GPS receiver 163a for communicating with a plurality of satellites so as to acquire current position information of the vehicle, a broadcast signal receiver 163b for receiving a broadcast signal from a broadcast station, and a communication interface 163c connected to an external device by wire or wirelessly so as to communicate with the server.

In this case, the external device may be a user equipment (UE) or a storage medium, and may include a smartphone, a tablet, a laptop, a USB memory, etc.

That is, the communication interface 163c may perform wired or wireless communication.

The communicator 163 may receive standby power from the power-supplier 190 during the standby mode. Therefore, the communicator may continuously communicate with the smart key or the external device during the standby mode.

The second controller 164 may control the drive part 170, and may communicate with the first controller 161.

Upon receiving the stoppage command from the first controller 161, the second controller 164 may stop the drive part 170.

Here, operation stoppage of the drive part 170 may include preventing power of the power-supplier 190 from being supplied to the drive part 170.

Upon receiving the operation command from the first controller 161, the second controller 164 may control operation of the drive part 170 on the basis of the accelerator pedal, the brake pedal, and position information of the shift lever.

In this case, the operation of controlling the drive part 170 may include supplying power of the power-supplier 190 to the drive part 170.

That is, the second controller 164 may stop control of the drive part 170 during the rest mode, and may prevent battery power from being supplied to the drive part 170.

Upon receiving the operation stoppage command, the second controller 164 may enter the standby mode. Upon receiving the operation command, the second controller 164 may enter the operation mode.

Upon receiving the operation command, the second controller 164 may stop operation. If the second controller 164 receives a power source by the first controller 161, the second controller 164 may also operate as desired.

That is, the second controller 164 may cut off battery power during the rest mode.

The vehicle may be disposed between the power-supplier 190 and the second controller 164, and may further include a switch (not shown) configured to power the second controller 164 on or off under control of the first controller 161.

The vehicle may be disposed between the power-supplier 190 and the drive part 170, and may further include a switch (not shown) configured to power the drive part 170 on or off under control of the first controller 161 or the second controller 164.

The second controller 164 may be integrated with the first controller 161.

The second controller 164 may be any one of an electronic control unit (ECU), a microprocessor, a CPU, and a processor configured to control vehicle traveling.

The first and second controllers 161 and 164 may be implemented as an algorithm for controlling the constituent elements contained in the vehicle, a memory (not shown) for storing data regarding a program implementing the algorithm, and a processor (not shown) for performing the above-mentioned operation using data stored in the memory. In this case, the memory and the processor may be implemented as different chips as desired. Alternatively, the memory and the processor may be implemented as a single chip.

Although the storage 162 may be implemented as any one of a non-volatile memory (e.g., a cache, a Read Only Memory (ROM), a Programmable ROM (PROM), an Erasable Programmable ROM (EPROM), an Electrically Erasable Programmable ROM (EEPROM), a flash memory, etc.), a volatile memory (e.g., a Random Access Memory (RAM)), and a storage medium (e.g., a Hard Disk Drive (HDD), a CD-ROM, etc.), the scope or spirit of the present disclosure is not limited thereto. The STORAGE 162 may be a memory that is implemented as a separate chip independent of the above processor related to the controller, or may be implemented as a processor and a single chip.

The drive part 170 may generate driving force, braking force, and steering force needed for vehicle traveling upon receiving power from the power-supplier.

The drive part 170 may include a power device 171, a braking device 172, and a steering device 173. The power device 171 may generate power needed for vehicle traveling, and may transmit the generated power to vehicle wheels. The braking device 172 may generate braking force of vehicle wheels. The steering device 173 may change a wheel angle by the steering wheel 132.

The power device 171 may include a power generation device and a power transmission device.

The power generation device may further include a motor, and the motor may rotate upon receiving power from the battery 191.

The motor may transmit rotational force generated by motor rotation to vehicle wheels 131, such that driving power may occur in the vehicle wheels 131.

The braking device 172 may include a foot brake device operated by the depressed brake pedal, and an EPB device operated by the parking button.

The steering device 173 may change the angle of wheels by rotating a rotation axis of a hub connected to a spoke of the steering wheel, and may thus perform steering.

The air conditioner 180 may adjust the indoor temperature of the vehicle to a target indoor temperature.

The air conditioner 180 may include a cooling cycle part which includes a compressor for compressing refrigerant, first and second heat exchangers, an expansion valve, etc. such that the air conditioner 180 may cause change of the refrigerant state through four steps (i.e., compression→condensation→expansion→evaporation of the refrigerant).

The air conditioner may further include a flow passage switching valve, and may change a circulation passage of the refrigerant by controlling the flow passage switching valve, such that the heating mode may be switched to the cooling mode or the cooling mode may be switched to the heating mode. In this case, the flow passage switching valve may be a 4-way valve.

The air conditioner 180 may further include a blowing fan. During the cooling mode, the air conditioner 180 may absorb heat through an indoor heat exchanger. If the outdoor air of the heat exchanger is heat-exchanged, heat-exchanged cold air is discharged to the indoor space of the vehicle by rotating the blowing fan. In this case, the indoor heat exchanger may serve as an evaporator.

The air conditioner 180 may control the indoor heat exchanger to emit heat during the heating mode. If the outdoor air of the heat exchanger is heat-exchanged, the air conditioner 180 may discharge the heat-exchanged warm air to the indoor space by rotating the blowing fan. In this case, the indoor heat exchanger may serve as a condenser.

The air conditioner of the hybrid vehicle may also include a cooling cycle part and a heat exchanger (i.e., a radiator) for heat-exchanging a coolant of the engine.

In this case, the air conditioner of the hybrid vehicle may allow the coolant to flow into the heat exchanger during the heating mode. If heat emitted from the heat exchanger and the outdoor air are heat-exchanged, the air conditioner may discharge the heat-exchanged warm air to the inner space by rotating the blowing fan, and may use the cooling cycle part during the cooling mode.

During the cooling mode, the heat exchanger of the cooling cycle part arranged in the inner space may be used as an evaporator, and the heat exchanger of the cooling cycle part arranged in the outer space may be used as a condenser.

The air conditioner 180 may further include an outdoor air fan which absorbs the outdoor air of the vehicle and discharges the air generated from the inner space of the vehicle to the outside, resulting in implementation of air circulation.

The power-supplier 190 may include a rechargeable battery 191 and a cooling part to cool the battery 191.

The battery 191 may provide power to various constituent elements embedded in the vehicle.

The battery 191 may be discharged when drive power is supplied to the constituent elements embedded in the vehicle.

The battery 191 can be rechargeable, and may receive power from the external part by wire or wirelessly such that the battery 191 can be recharged.

The cooling part may be a water-cooled cooling part or an air-cooled cooling part.

The power-supplier 190 may further include an inverter for converting a direct current (DC) of the battery 191 into alternating current (AC) so as to drive the motor and the generator, and a converter for converting power of the battery 191 into drive power of the constituent elements.

The power-supplier 190 may include a plug connectable to a wire plug of an external charger arranged in a parking lot or charging station.

The power-supplier 190 may further include a plug for providing power of the battery 191 as drive power of the external device.

The vehicle may be a constituent element to be controlled by the first controller during the rest mode, may further include an opening/closing part 116a, a cluster 123, and a lighting part 117, and may further include heating elements (not shown) and a ventilator (not shown).

The opening/closing part 116a may be mounted to each of the front, rear, left and right window glasses 116, such that each of the front, rear, left and right window glasses 116 may be automatically opened or closed.

Referring to FIG. 5, the cluster 123 may include a display 123a. The display 123a may display the amount of battery charges, the rest mode, the parking brake state, etc., and may further display the outdoor temperature and the indoor temperature of the vehicle.

The display 123a of the cluster may display an icon image (a1) corresponding to the amount of battery charges, a character image (a2) corresponding to a lock state of the parking brake, and a rest-mode image (a3) configured to display current execution of the rest mode.

If the rest mode is released, the display 123a of the cluster may remove the image corresponding to the rest mode, and may display an image corresponding to the traveling mode.

The lighting part 117 may include a high beam lamp, a low beam lamp, an emergency lamp, a fog lamp, and a side lamp indicating a vehicle width, that are installed externally. The lighting part 117 may include an indoor lamp installed inside the vehicle.

The lamps installed outside the lighting part 117 may operate as the outdoor lighting source during the rest mode, and the indoor lamp may operate as the indoor lighting source.

The heating element (not shown) and the ventilator (not shown) may be selectively provided to at least one seat.

The above-mentioned method for controlling the vehicle will hereinafter be described with reference to FIGS. 6 to 10.

Figure 6:
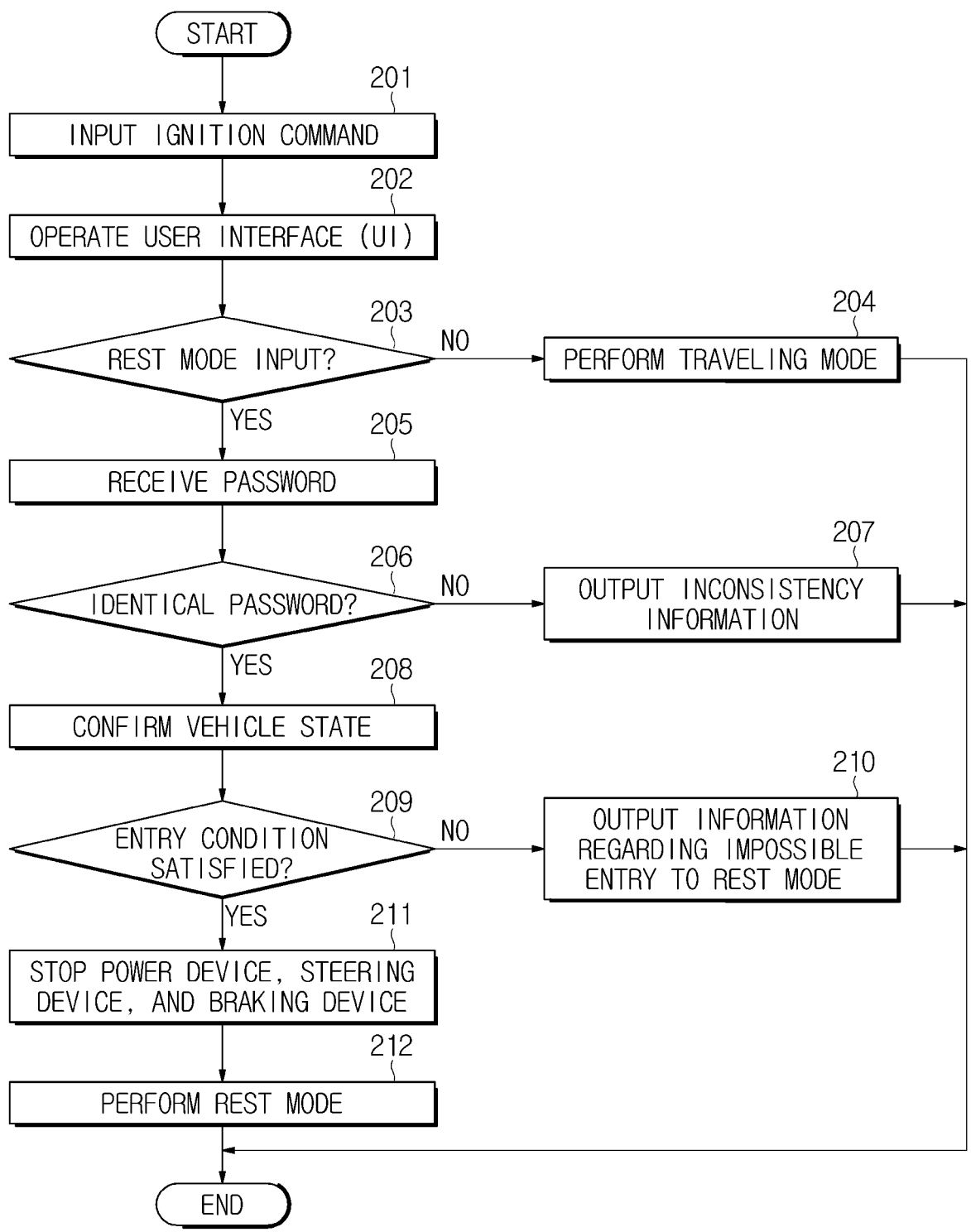
FIG. 6 is a flowchart illustrating a method for entering a rest mode of the vehicle in one form of the present disclosure.

FIG. 6 is a flowchart illustrating a method for controlling entry to the rest mode of the vehicle in one form of the present disclosure.

When a start command is input to the vehicle after the ignition button 126a is switched on (Operation 201), power is supplied to the drive part configured to generate driving force, braking force, and steering force needed for vehicle traveling. And the power is also supplied to the user interface (UI), the head unit, and the air conditioner, as well as to the other constituent elements embedded in the vehicle.

As a result, the vehicle may operate the drive part, the UI, the head unit, the air conditioner, and other constituent elements embedded in the vehicle.

Once the UI is operated by power supplied to the vehicle (Operation 202), the rest mode button may be displayed through the UI.

In this case, display of the rest mode button may include displaying the rest mode button during a predetermined time.

The vehicle may determine whether a command of the rest mode is input through the UI (Operation 203). If the command of the rest mode is not input, the vehicle may determine that the ignition purpose of the vehicle is to perform vehicle traveling, such that the traveling mode is carried out (Operation 204).

Here, the execution of the traveling mode may continuously supply power to various constituent elements of the vehicle.

The determining whether the command of the rest mode is input may include determining whether the command of the rest mode is input through the input of the head unit.

When the command of the rest mode is input, the vehicle may display a message for requesting password input from the user or driver through the UI.

Once the vehicle receives a password entered through the UI or a separate input (Operation 205), the vehicle may determine whether the received password is identical to a predetermined password (Operation 206). If the received password is different from the predetermined password, the vehicle may output password disagreement information (Operation 207), and may output entry prohibition information of the rest mode.

In addition, the vehicle may repeatedly perform display a message for requesting re-input of the password, and determine whether password consistency is achieved. Here, the above-mentioned repetition operation may be performed a predetermined number of times.

If the received password is identical to a predetermined password, the vehicle state may indicate whether the vehicle can enter the rest mode (Operation 208).

In this case, the vehicle state may include at least one of an EPB state, a vehicle speed, a communication state of the smart key, and the amount of battery charges.

If at least one of the vehicle states does not satisfy a condition, it is determined that the vehicle cannot enter the rest mode, and information indicating that the vehicle cannot enter the rest mode may be displayed (Operation 210).

In addition, information indicating that the vehicle cannot enter the rest mode may include vehicle state information causing prohibition of entry to the rest mode.

For example, the vehicle may display various kinds of entry prohibition cause information, for example, EPB lock/release information, information regarding insufficient amount of battery charges, information regarding unavailable communication with the smart key, etc.

In contrast, when it is determined that the vehicle can enter the rest mode, the vehicle may prevent power from being supplied to both the drive part and the second controller controlling the drive part, such that the power device, the braking device, and the steering device of the drive part can be stopped (Operation 211).

Power supplied to the UI, the air conditioner, the head unit, and the communicator may be maintained in such a manner that the UI, the air conditioner, the head unit, and the communicator can operate, resulting in execution of the rest mode (Operation 212).

Here, when the EPB device is locked, the EPB device can communicate with the smart key, the vehicle speed is zero (i.e., a stop state), and the amount of battery charges is equal to or greater than a reference amount of battery charges, it is determined that the vehicle can enter the rest mode.

In this case, the reference amount of battery charges may be the amount of battery charges detected by the charge amount detector 154, and may be a minimum amount of battery charges desired for the vehicle to travel a predetermined distance using the battery charge amount detected by the charge amount detector 154.

The reference battery charge amount may be denoted by approximately SOC 10%.

When the vehicle enters the rest mode, the vehicle may display at least one function button capable of being selected by the user through the user interface (UI), may confirm the user-selected function button, and may perform a function corresponding to the confirmed function button.

In this case, the function capable of being executed by the vehicle during the rest mode may include at least one of a video function, an audio function, a radio function, and an Internet function capable of being performed through the UI, may include a temperature control function capable of being executed through the air conditioner, and may include an outdoor lighting function executable by the lighting part and an external power supply function executable by the power-supplier.

The temperature control function may include a heating mode, a cooling mode, and an outdoor air mode. The heating mode, the cooling mode, and the outdoor air mode may be selected through the UI or the head unit.

In addition, when the temperature control function is performed, the vehicle may operate the air conditioner on the basis of not only a target indoor temperature received through at least one of the UI and the head unit, but also the indoor and outdoor temperatures detected by the detector.

The vehicle may recognize a season on the basis of at least one of the outdoor temperature, the month (or date), and the difference between the outdoor temperature and the indoor temperature, and may determine any one of the heating mode and the cooling mode on the basis of the recognized season.

If the Internet function is selected, the vehicle may communicate with the external server through wired or wireless communication.

The vehicle may perform the radio function and the audio function through the head unit.

If the outdoor lighting function is selected, the vehicle may switch on the outdoor lighting part on the basis of either illuminance detected by an illuminance detector (not shown) or a command of the user who desires to switch on the lighting part.

During the rest mode, the vehicle may periodically confirm the amount of battery charges, and may stop the rest mode on the basis of the confirmed battery charge amount.

The vehicle may display the confirmed battery charges, may display the rest mode and the functions, and may display the EPB lock state.

Figure 7A:
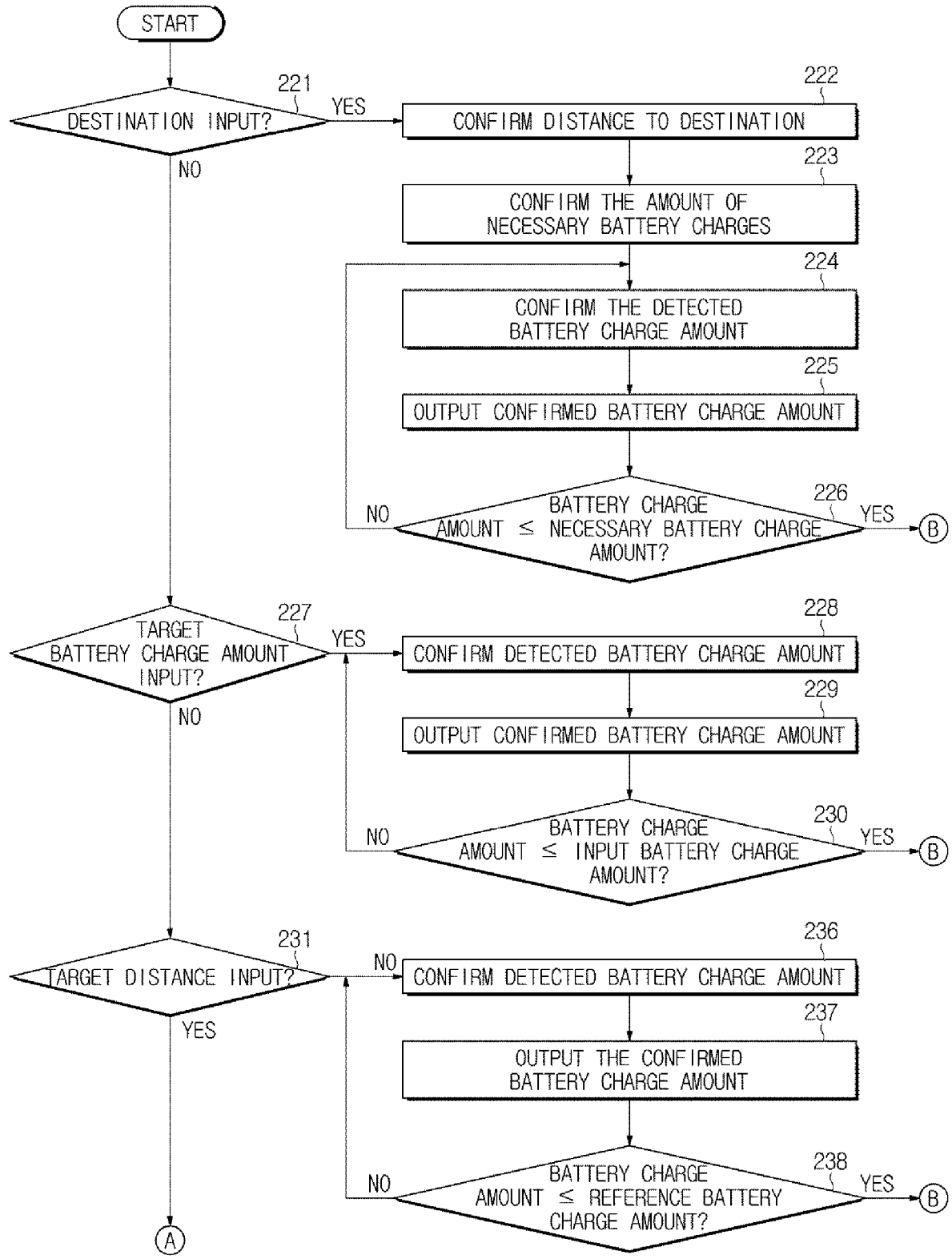
FIGS. 7A and 7B are flowcharts illustrating a method for controlling a stoppage of a rest mode of the vehicle in one form of the present disclosure.
Figure 7B:
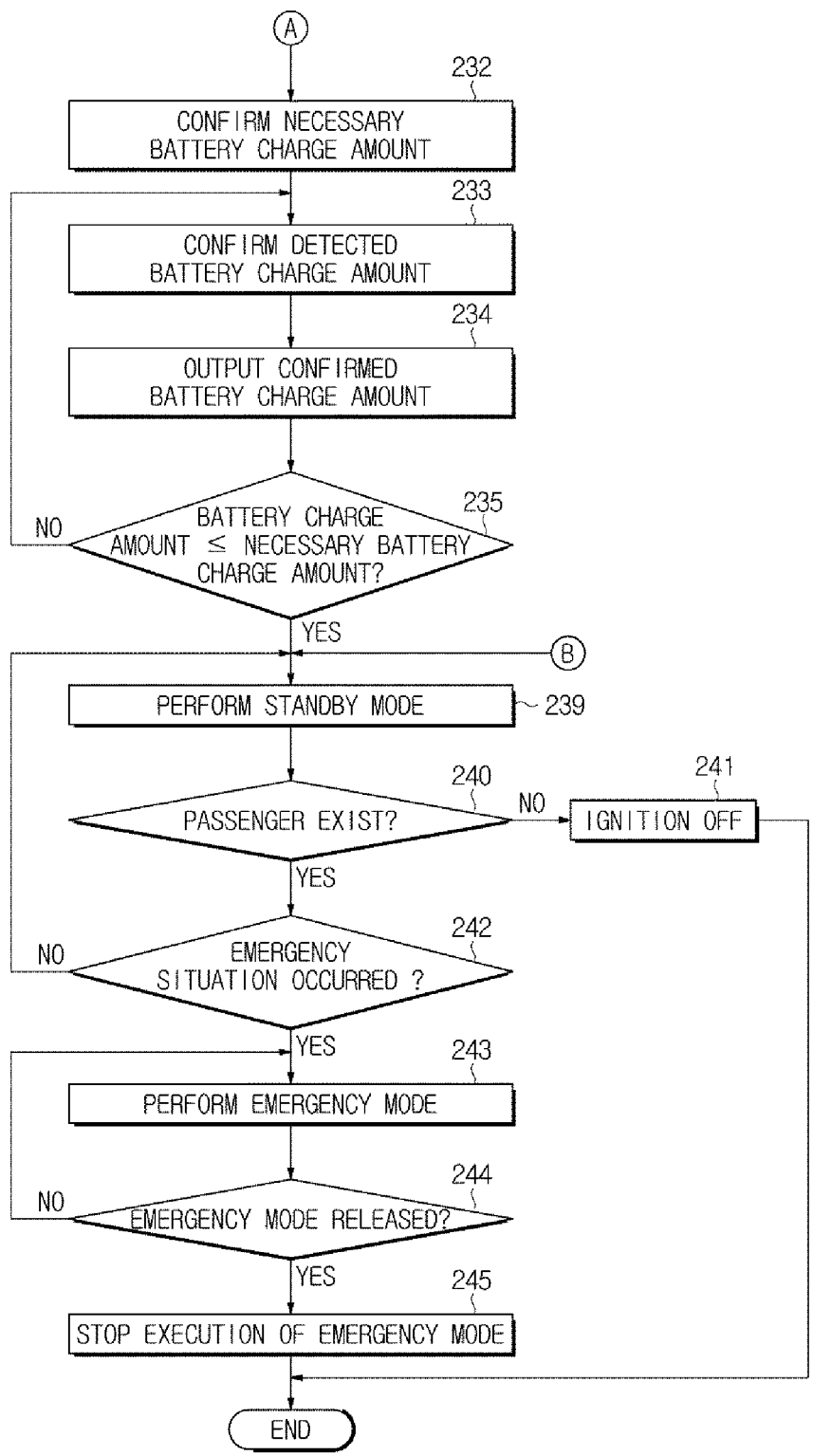

The above-mentioned operation for controlling the vehicle will hereinafter be described with reference to FIGS. 7A and 7B.

When the vehicle enters the rest mode, a message for requesting destination input, a message for requesting input of a target battery charge amount, and a message for requesting input of the distance to the destination may be output through the user interface (UI).

If the destination is input through the UI or a separate input (e.g., a jog dial) (Operation 221), the vehicle may confirm current position information on the basis of satellite information received through the GPS receiver, and may confirm the distance from the current position to the destination on the basis of the confirmed current position information and position information corresponding to the destination (Operation 222).

Subsequently, the vehicle may confirm a necessary battery charge amount corresponding to the confirmed distance (Operation 223).

The vehicle may confirm the battery charge amount detected by the charge amount detector (Operation 224). In this case, the vehicle may output the confirmed battery charge amount through the cluster, or may transmit the confirmed battery charge amount to the user equipment (UE) (Operation 225).

The vehicle may compare the confirmed battery charge amount with the necessary battery charge amount. If the detected battery charge amount is equal to or less than the necessary battery charge amount (Operation 226), the vehicle may stop execution of the rest mode. In this case, the vehicle may temporarily stop the rest mode or may enter the standby mode (Operation 239).

If a target battery charge amount is input through the UI or a separate INPUT (e.g., a jog dial) (Operation 227), the vehicle may store the input target battery charge amount.

The vehicle may confirm the battery charge amount detected by the charge amount detector (Operation 228). In this case, the vehicle may output the confirmed battery charge amount through the cluster, or may transmit the confirmed battery charge amount to the UE (Operation 229).

The vehicle may compare the confirmed battery charge amount with the target battery charge amount. If the detected battery charge amount is equal to or less than the target battery charge amount (Operation 230), the vehicle may stop execution of the rest mode. In this case, the vehicle may temporarily stop the rest mode or may perform the standby mode (Operation 239).

If a target distance is input through the UI or the separate input (e.g., a jog dial), the vehicle may confirm a necessary battery charge amount corresponding to the target distance (Operation 232).

The vehicle may confirm the battery charge amount detected by the charge amount detector (Operation 233). In this case, the vehicle may output the confirmed battery charge amount through the cluster or may transmit the confirmed battery charge amount to the UE (Operation 234).

The vehicle may compare the confirmed battery charge amount with the necessary battery charge amount. If the detected battery charge amount is equal to or less than the necessary battery charge amount (Operation 235), the vehicle may stop execution of the rest mode. In this case, the vehicle may temporarily stop the rest mode or may enter the standby mode (Operation 239).

If the destination, the target battery charge amount, and the target distance are not input, the vehicle may confirm the battery charge amount detected by the charge amount detector (Operation 236). In this case, the vehicle may output the confirmed battery charge amount through the cluster or may transmit the confirmed battery charge amount to the UE (Operation 237).

The vehicle may compare the confirmed battery charge amount with the reference battery charge amount. If the detected battery charge amount is equal to or less than the reference battery charge amount (Operation 238), the vehicle may stop execution of the rest mode. In this case, the vehicle may temporarily stop the rest mode or may perform the standby mode (Operation 239).

During the standby mode, the vehicle may determine the presence or absence of a passenger in the indoor space of the vehicle (Operation 240). If the passenger is not present in the indoor space of the vehicle, the ignition of the vehicle is turned off (Operation 241). When the presence of the passenger is decided, the vehicle may periodically determine whether an emergency situation occurs on the basis of the indoor temperatures detected by the first, second, and third temperature detectors, the outdoor temperature, and the battery temperature (Operation 242).

If the emergency situation has occurred, the vehicle may enter the emergency mode (Operation 243).

The vehicle may determine whether the emergency mode is released on the basis of the indoor temperatures detected by the first to third temperature detectors, the outdoor temperature, and the battery temperature (Operation 244).

The vehicle may determine whether an emergency mode release command is received through the UE.

Once the emergency mode has been released, the vehicle may stop the emergency mode (Operation 245). The vehicle may detect the amount of battery charges, may output the detected battery charge amount through the cluster, or may transmit the detected battery charge amount to the UE.

The vehicle may stop the emergency mode, and may periodically recognize the presence or absence of the emergency situation on the basis of the presence or absence of a passenger. If the emergency situation occurs, the vehicle may stop the emergency mode.

If the emergency mode is stopped, the ignition of the vehicle may be turned off.

In addition, the vehicle may acquire position information of the charging station located in the vicinity of a current vehicle position on the basis of the current position information of the vehicle and map information, may acquire the distance to the position of the charging station on the basis of the acquired charging station position information and the current position information, may acquire the amount of battery charges corresponding to the acquired distance, and may stop the rest mode on the basis of the acquired battery charge amount and then perform the emergency mode.

As described above, assuming that the command for the rest mode is input, the constituent elements related to vehicle traveling may be stopped, and only the air conditioner and the UI are operated, such that power charged in the battery is maximally utilized. As a result, the indoor space of the vehicle can be used not only as a resting and convenience space of the user, but also as a safe space.

That is, power consumption of the traveling-related constituent elements can be reduced, such that battery power used in the rest mode can be improved and the time for the rest mode can also be increased.

In accordance with the form, if the command of the rest mode is input, the battery may be used as a power source of the external electronic device, and the lighting part is turned on, such that the lighting part may be used as the outdoor lighting.

For example, the lighting part may be used as a power source of a camping ground, or may be used as a power source of a food truck.

In one form, during the rest mode, the vehicle may establish a destination and may retain battery power desired for navigation to the destination, such that the vehicle can safely move to the destination after execution of the rest mode.

For example, the indoor space of the stopped vehicle may be used as a common lodging house, a resting space, and a sleeping space.

In addition, under the condition that a guardian or protector is not present in the vehicle, the indoor space of the vehicle may be used as a space for protecting children and a safe play space for children. In this case, the vehicle may provide children with various entertainment and content (movies, broadcasts, music, Internet, etc.).

The vehicle and the method for controlling the same according to the forms of the present disclosure can perform and release the rest mode through a password entered by the user or driver of the vehicle, resulting in prevention of vehicle burglary.

A method for controlling the emergency mode of the vehicle during the rest mode of the vehicle will hereinafter be described with reference to FIGS. 8 and 9.

Figure 8:
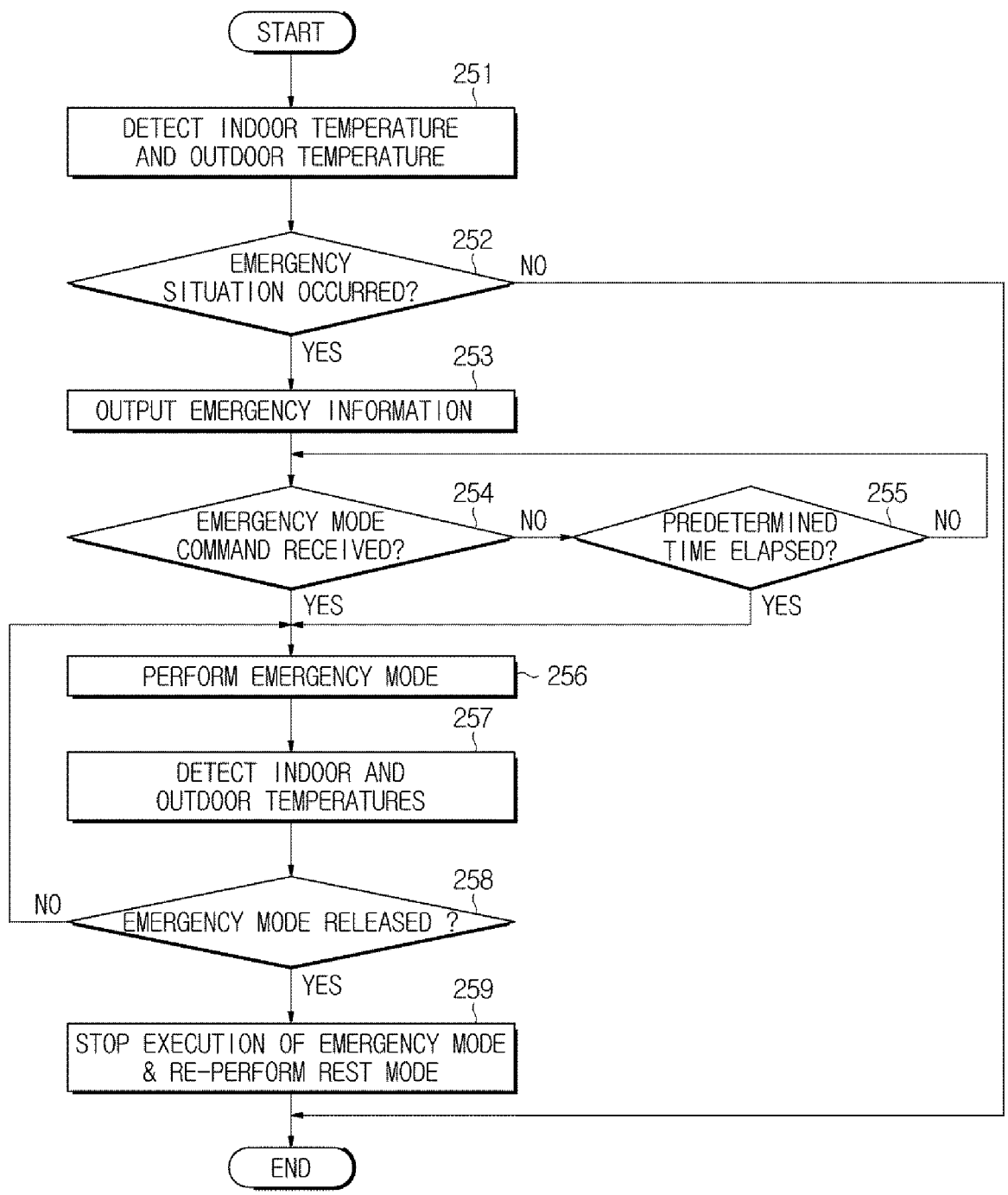
FIGS. 8 and 9 are flowcharts illustrating a method for controlling an emergency mode during the rest mode of the vehicle in one form of the present disclosure.

FIG. 8 is a flowchart illustrating a method for controlling the emergency mode related to the indoor temperature control during the rest mode of the vehicle.

During the rest mode, the vehicle may perform at least one of the video function, the audio function, and the radio function. When the air conditioner is turned off or malfunction of the air conditioner occurs, the temperature control function is not performed such that the emergency situation may occur.

In addition, when the target indoor temperature is inappropriate for the season, or when the cooling mode and the heating mode are wrongly established, the emergency situation may occur.

For this purpose, the vehicle may detect the indoor temperature and the outdoor temperature through the first and second temperature detectors during the rest mode (Operation 251). The vehicle may determine whether an emergency situation occurs on the basis of the detected indoor temperature and outdoor temperature (Operation 252). The vehicle may output emergency information through the cluster, and may transmit emergency information denoted by letters (or characters) to the UE (Operation 253).

If the indoor temperature detected during the heating mode deviates from a first allowable indoor temperature range, or if the indoor temperature detected during the cooling mode deviates from a second allowable indoor temperature range, the vehicle may determine the occurrence of the emergency situation.

The first allowable indoor temperature range may be a temperature range within which a pleasant indoor temperature is achieved during the heating mode. The second allowable indoor temperature range may be a temperature range within which a pleasant indoor temperature is achieved during the cooling mode.

If the outdoor temperature detected in winter (in which the heating mode is performed) is equal to or less than the first allowable outdoor temperature, or if the outdoor temperature detected in summer (in which the cooling mode is performed) is equal to or higher than the second allowable outdoor temperature, occurrence of an emergency situation may be decided.

The first and second allowable outdoor temperatures is set as a temperature beyond which the vehicle cannot retain the target indoor temperature which indicates a pleasant indoor temperature in the heating or cooling modes.

The vehicle may determine whether an execution command of the emergency mode is received from the UE (Operation 254). If the execution command of the emergency mode is not received from the UE, the vehicle may determine whether a predetermined time has elapsed from an emergency situation occurrence time (Operation 255). When the predetermined time has elapsed from the emergency situation occurrence time, the vehicle may perform the emergency mode (Operation 256).

Once the vehicle receives the execution command of the emergency mode, the vehicle may enter the emergency mode (Operation 256).

The vehicle may determine whether the air conditioner malfunctions during the emergency mode. If the air conditioner malfunctions, the vehicle may control the opening/closing part so that the window glasses can be opened at a predetermined opening angle and the outdoor air fan operates for circulation of the indoor air and the outdoor air.

If the vehicle determines that the emergency mode is not caused by malfunction of the air conditioner and is caused by the indoor or outdoor temperature, the vehicle may control the air conditioner or the opening or closing operation of the window glasses, and may also control the outdoor air fan as desired.

The vehicle may determine whether or not the emergency mode is released on the basis of the indoor and outdoor temperatures detected by the first and second temperature detectors (Operation 258).

In addition, the vehicle may determine whether the emergency mode release command is received through the UE.

If the emergency mode is released, the vehicle may stop the emergency mode and may re-perform the rest mode (Operation 259).

In addition, the vehicle may also perform the emergency mode while simultaneously performing the rest mode.

The vehicle may detect the amount of battery charges, may output the amount of detected battery charges through the cluster, or may output the amount of detected battery charges to the UE.

The vehicle may periodically recognize the emergency situation after stopping operation of the emergency mode. If the emergency situation occurs, the vehicle may perform the emergency mode.

Figure 9:
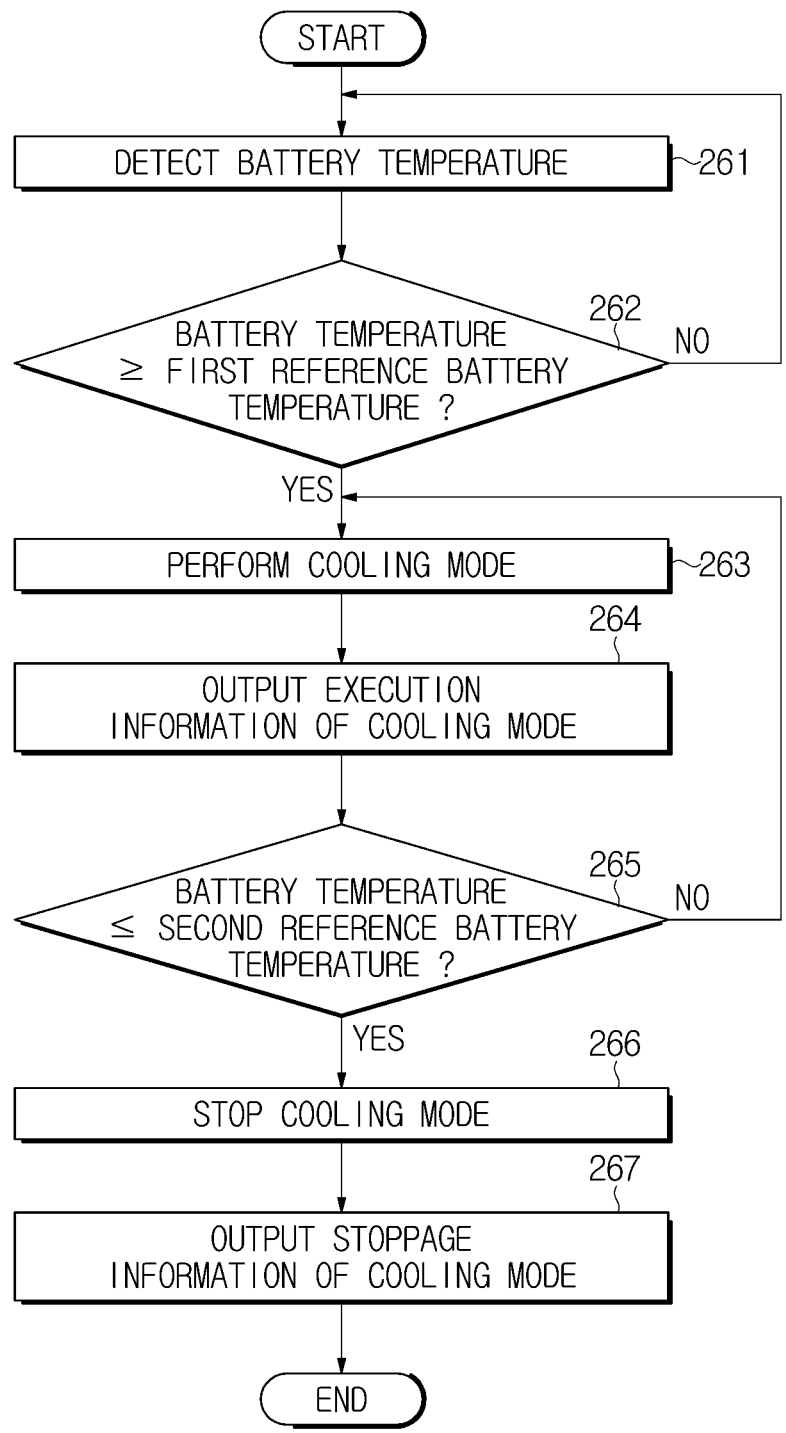

FIG. 9 is a flowchart illustrating a method for controlling the emergency mode related to the battery temperature during the rest mode of the vehicle.

If the battery overheats during the rest mode of the vehicle, the emergency situation may occur.

For this purpose, the vehicle may detect the battery temperature using a third temperature detector during the rest mode (Operation 261), and may compare the detected battery temperature with a first reference battery temperature. If the detected battery temperature is equal to or higher than the first reference battery temperature (Operation 262), the vehicle may determine the occurrence of the emergency situation and may perform the cooling mode by operating the cooling part (Operation 263), and may output execution information of the cooling mode through the cluster or may transmit the execution information of the cooling mode to the UE (Operation 264).

In this case, execution of the cooling mode may include controlling cold air of the indoor space to flow into the battery by operating the compressor of the air conditioner.

Alternatively, execution of the cooling mode may include controlling a low-temperature refrigerant to flow into the battery by operating the compressor of the air conditioner.

During the cooling mode, the vehicle may detect the battery temperature using the third temperature detector, and may compare the detected battery temperature with a second reference battery temperature. If the detected battery temperature is equal to or less than the first reference battery temperature (Operation 265), the vehicle may determine that the emergency situation is released, may stop the cooling mode by stopping the cooling part (Operation 266), may output information regarding execution stoppage of the cooling mode through the cluster or may output the execution stoppage information to the UE (Operation 267).

If the emergency mode stops, the vehicle may re-enter the rest mode.

In addition, the vehicle may perform the rest mode and at the same time may perform the emergency mode as desired.

Figure 10:
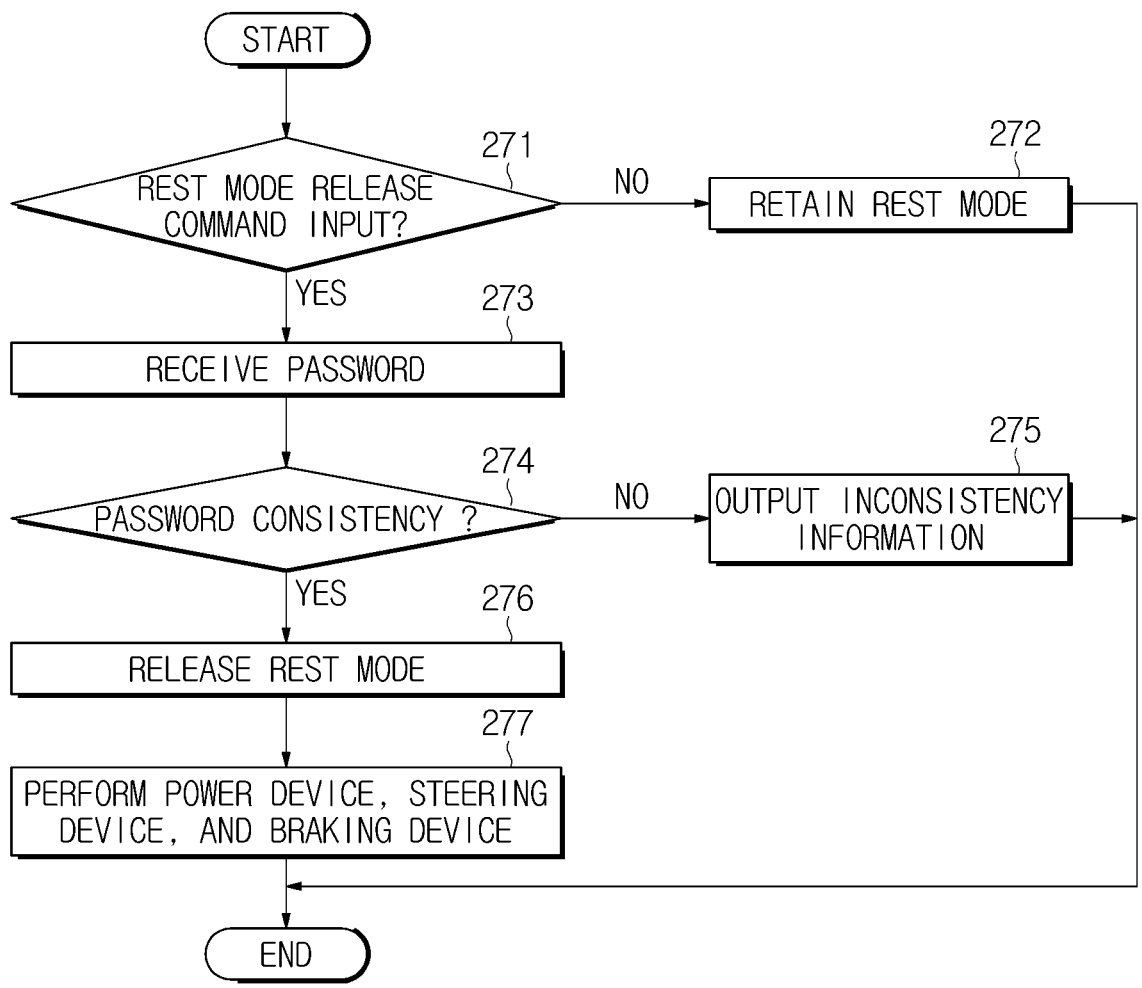
FIG. 10 is a flowchart illustrating a method for controlling release of the rest mode of the vehicle in one form of the present disclosure.

FIG. 10 is a flowchart illustrating a method for releasing the rest mode of the vehicle in one form of the present disclosure.

Referring to FIG. 10, the vehicle may determine whether the rest mode release command is input through the UI or the input of the head unit during the rest mode (Operation 271). If the release command of the rest mode is not input, the vehicle may remain in the rest mode (Operation 272). If the release command of the rest mode is input, the vehicle may display a message for requesting password input through the UI.

If the vehicle receives a password entered through the UI or a separate input (Operation 273), the vehicle may determine whether the received password is identical to a predetermined password (Operation 274). If the received password is not identical to the predetermined password, the vehicle may output information regarding password inconsistency (Operation 275), and may output release impossible information of the rest mode.

In addition, the vehicle may repeatedly perform display a message for requesting re-input of the password, and determine whether password consistency is achieved. Here, the above-mentioned repetition operation may be performed a predetermined number of times.

If the received password is identical to a predetermined password, the vehicle state may sever communication for the rest mode related to the UE, and may release the rest mode (Operation 276).

In addition, the vehicle may receive the release command of the rest mode from the UE, and may also receive a password from the UE.

If the vehicle can communicate with the smart key, the vehicle may release the rest mode as desired.

The vehicle may provide power not only to the drive part for generating driving force, braking force, and steering force needed for vehicle traveling, but also to the second controller, such that the drive part and the second controller can operate (Operation 277).

As a result, the vehicle may operate the drive part, the UI, the head unit, the air conditioner, and various constituent elements embedded in the vehicle.

The vehicle may enter the traveling mode, may display the traveling mode through the cluster, and may perform navigation on the basis of destination information and current position information.

The vehicle may display the amount of battery charges through the cluster. If the amount of battery charges is equal to or less than the reference amount of battery charges due to the emergency mode, or if the amount of battery charges approximates to the reference amount of battery charges, the vehicle may also output the charging requesting information as desired.

The vehicle may display position information of the charging station located in the vicinity of the current position of the vehicle. The vehicle may perform navigation from the current position to the charging station, and may also output the charging time needed to arrive at the destination as desired.

As described above, the vehicle according to the form powers off the drive part during the rest mode, such that the amount of battery power to be consumed in the rest mode can be reduced.

In addition, during the rest mode, the vehicle can confirm the amount of battery charges and at the same time can adjust a temperature of the indoor space of the vehicle. As a result, when the vehicle moves to another place, the vehicle can travel on the road using the battery having the optimum charge amount.

As described above, the forms of the present disclosure can increase user convenience and user satisfaction of the vehicle.

As is apparent from the above description, the vehicle and the method for controlling the same according to the forms of the present disclosure can stop the constituent elements related to vehicle traveling when a rest mode starts, and can operate only an air conditioner and a user interface (UI) to maximally utilize power stored in a battery, such that the indoor space of the vehicle can be used not only as a resting and convenience space of the user, but also as a safety space.

That is, power consumption of the constituent elements related to vehicle driving can be reduced, such that battery power used in the rest mode can be improved and a time to be used for the rest mode can also be enhanced.

If the command of the rest mode is input, the battery is used as a power source of the external electric device, and a lighting part is turned on, such that the lighting part can be used as the outdoor lighting at night.

For example, the lighting part may be used as a power source of a camping ground, or may be used as a power source of a food truck.

In addition, during the rest mode, the vehicle may establish a destination and may retain battery power needed for navigation to the destination, such that the vehicle can safely move to the destination after execution of the rest mode.

For example, the indoor space of the stopped vehicle can be used as a common lodging house, a resting space, and a sleeping space.

In addition, under the condition that a guardian or protector is not present in the vehicle, the indoor space of the vehicle may be used as a space for protecting children and a safe play space for children. In this case, the vehicle may provide children with various entertainments and content (movie, broadcasting, movie, Internet, etc.).

The vehicle and the method for controlling the same according to the forms of the present disclosure can perform and release the rest mode through a password entered by a user or driver of the vehicle, resulting in prevention of vehicle burglary.

As described above, the forms of the present disclosure can increase the quality and marketability of the vehicle in the rest mode, can increase user satisfaction, and can guarantee product competitiveness.

Although a few forms of the present disclosure have been shown and described, it would be appreciated by those skilled in the art that changes may be made in these forms without departing from the principles and spirit of the present disclosure.

What is claimed is:

1. A vehicle comprising:
a power-supplier including a battery and a cooling part to cool the battery, wherein the cooling part includes a water-cooled cooling part or an air-cooled cooling part;
a charge amount detector configured to detect an amount of charge of the battery;
a temperature detector configured to detect a temperature of the battery;
a starting part including an ignition button configured to receive an ignition command of the vehicle;
a drive part configured to generate driving force, braking force, and steering force using power of the power-supplier, the drive part including a motor configured to generate rotational force upon receiving the power and to transmit the generated rotational force to vehicle wheels;
a user interface configured to receive power from the power-supplier, receive a command from a user, and output image information; and
a controller configured to:
control the drive part and the user interface upon receiving the ignition command, stop operation of the drive part upon receiving a command of a rest mode, and control operation of the user interface,
control operation of the cooling part when the detected temperature of the battery is equal to or higher than a reference battery temperature during the rest mode,
when destination information is input to the user interface, acquire an amount of necessary power required to drive to a destination based on the destination information, and
when the amount of necessary power is less than or equal to the detected amount of charge of the battery, stop the rest mode.

2. The vehicle according to claim 1,
wherein the controller is configured to:
control an entry to the rest mode when the detected amount of charge of the battery is equal to or greater than a reference power amount, and
control output of information indicating an impossible entry to the rest mode when the detected amount of charge of the battery is less than the reference power amount.

3. The vehicle according to claim 2, further comprising:
a parking button configured to receive a lock or a release command of an electronic parking brake (EPB) device,
wherein the controller is configured to control the entry to the rest mode when the parking button is turned on.

4. The vehicle according to claim 1,
wherein the controller is configured to periodically detect the amount of charge of the battery during the rest mode, and control ignition off when the detected amount of charge of the battery is less than a reference power amount.

5. The vehicle according to claim 4, further comprising:
a communicator configured to communicate with an external terminal,
wherein the controller is configured to control the communicator to periodically transmit the detected electric power amount to the external terminal.

6. The vehicle according to claim 1, wherein:
when the command of the rest mode is input, the controller is configured to sever power supplied to the drive part by controlling the power-supplier.

7. A vehicle comprising:
a power-supplier including a battery and a cooling part to cool the battery, wherein the cooling part includes a water-cooled cooling part or an air-cooled cooling part;
a temperature detector configured to detect a temperature of the battery;
a charge amount detector configured to detect an amount of charge of the battery;
a starting part including an ignition button configured to receive an ignition command of the vehicle;
a drive part configured to generate driving force, braking force, and steering force using power of the power-supplier, the drive part including a motor configured to generate rotational force upon receiving the power and to transmit the generated rotational force to vehicle wheels;
at least one temperature detector configured to detect an indoor temperature and an outdoor temperature;
an air conditioner configured to receive power of the power-supplier, and adjust the indoor temperature;
an input configured to receive an operation command of the air conditioner, a target indoor temperature, and a command of a rest mode; and
a controller configured to:
control the drive part and the air conditioner upon receiving the ignition command, a stop operation of the drive part upon receiving the command of the rest mode,
control the air conditioner on the basis of the detected indoor temperature and the detected outdoor temperature,
control operation of the cooling part when the detected temperature of the battery is equal to or higher than a reference battery temperature during the rest mode,
when destination information is input to an user interface, acquire an amount of necessary power required to drive to a destination based on the destination information, and
when the amount of necessary power is less than or equal to the detected amount of charge of the battery, stop the rest mode.

8. The vehicle according to claim 7,
wherein the controller is configured to control an entry to the rest mode when the detected charge amount is equal to or greater than a reference power amount, to control output of information indicating an impossible entry to the rest mode when the detected charge amount is less than the reference power amount, to periodically detect the detected charge amount during the rest mode, and to control ignition off when the detected charge amount is less than the reference power amount.

9. The vehicle according to claim 8, further comprising:
a communicator configured to communicate with an external terminal,
wherein the controller is configured to control the communicator to periodically transmit the detected charge amount to the external terminal.

10. The vehicle according to claim 7, further comprising:
a passenger detector configured to detect a presence or an absence of a passenger; and
a communicator configured to communicate with an external terminal,
wherein the controller is configured to control an emergency mode on the basis of the indoor temperature and the outdoor temperature when the presence of the passenger is decided during ignition-off control, and to control the communicator to transmit information of the emergency mode to the external terminal.

11. The vehicle according to claim 10, further comprising:
an outdoor air fan configured to circulate outdoor air and indoor air; and
an opening/closing part configured to open or close window glasses,
wherein the controller is configured to operate at least one of the outdoor air fan and the opening/closing part during control of the emergency mode.

12. The vehicle according to claim 7, further comprising:
a lighting part provided in an exterior part of a body of the vehicle,
wherein the controller is configured to control lighting of the lighting part when a lighting function is selected by the input during the rest mode.

13. A method for controlling a vehicle configured to travel using a battery and a motor, comprising:
upon receiving an ignition command, providing, by a controller, power of a power-supplier to a drive part including the motor needed for vehicle traveling, an air conditioner needed to adjust a temperature of air, and a user interface (UI) needed to input or output information;
upon receiving a command of a rest mode, severing, by the controller, power supplied to the drive part, continuously providing power to at least one of the air conditioner or the user interface (UI), and performing the rest mode;
when destination information is input by the user interface, acquiring, by the controller, an amount of necessary power required to drive to a destination based on the destination information;
detecting, by a charge amount detector, detecting an amount of charge of the battery;
stopping, by the controller, the rest mode when the amount of necessary power is less than or equal to the amount of charge of the battery.

14. The method according to claim 13, wherein the performing the rest mode includes:
detecting, by at least one temperature detector, an indoor temperature and an outdoor temperature; and
controlling, by the controller, the air conditioner on the basis of the detected indoor temperature and the detected outdoor temperature.

15. The method according to claim 14, wherein the performing the rest mode includes:
outputting at least one of image information or sound information through the user interface (UI).

* * * * *